United States Patent [19]
Galensky et al.

[11] Patent Number: 4,697,264
[45] Date of Patent: Sep. 29, 1987

[54] BIT COMPRESSION MULTIPLEXING

[75] Inventors: Duane Galensky, Holmdel; Warren G. Hammett, Middletown, both of N.J.

[73] Assignee: American Telephone and Telegraph Company, AT&T Bell Laboratories, Murray Hill, N.J.

[21] Appl. No.: 786,292

[22] Filed: Oct. 10, 1985

Related U.S. Application Data

[63] Continuation of Ser. No. 496,199, May 19, 1983, abandoned.

[51] Int. Cl.$^4$ .............................. H04J 3/06; H04J 3/12
[52] U.S. Cl. ....................................... 370/111; 370/99
[58] Field of Search ....................... 370/99, 110.1, 111

[56] References Cited

U.S. PATENT DOCUMENTS

| | | | |
|---|---|---|---|
| 3,995,119 | 11/1976 | Pachynski, Jr. | 370/111 |
| 3,995,120 | 11/1976 | Pachynski, Jr. | 370/111 |
| 4,245,340 | 1/1981 | Landry | 370/111 |
| 4,358,845 | 11/1982 | De Passoz | 370/110.1 |
| 4,520,480 | 5/1985 | Kawai | 370/111 |

OTHER PUBLICATIONS

CCITT Recommendation G.732—Characteristics of Primary PCM Multiplex Equipment Operating at 2048 KBit/Sec—Geneva 1972.

CCITT Recommendation G.761—General Characteristics of a 60 Channel Transcoder Equipment.

*Primary Examiner*—Joseph A. Orsino, Jr.
*Attorney, Agent, or Firm*—Thomas Stafford

[57] ABSTRACT

A bit compression multiplexer for a pair of time division multiplexed digital bit streams each one of which includes a plurality of PCM encoded signals deposited in separate and distinct channels and signaling bits multiplexed therewith. The encoded signals are bit compressed (22), and then multiplexed and grouped (25) into clusters. Each of the multiplexed compressed signals occupies a separate and distinct channel of a repetitive frame that includes a plurality of clusters and a corresponding number of additional channels, called delta channels, each one of which is associated with a given cluster and is proximate thereto. The signaling bits are extracted (21) from the pair of digital bit streams, reformatted (24) and then placed in predetermined bit positions of the delta channels. The signaling bits in a given delta channel are associated with the compressed signals of a cluster proximate thereto. The combination of a cluster and its related delta channel comprise a bundle. A framing bit pattern is developed (23) for each bundle and the framing bits are placed into a predetermined bit position of each of the delta channels.

7 Claims, 5 Drawing Figures

| FRAME NUMBER | S | S/RA | D | F |
|---|---|---|---|---|
| 1 | A1 | A2 | 1 | 0 |
| 2 | A3 | A4 | 1 | 0 |
| 3 | A5 | A6 | 1 | 0 |
| 4 | A7 | A8 | 1 | 0 |
| 5 | A9 | A10 | 1 | 0 |
| 6 | A11 | Y | 1 | 0 |
| 7 | B1 | B2 | 1 | 0 |
| 8 | B3 | B4 | 1 | 0 |
| 9 | B5 | B6 | 1 | 0 |
| 10 | B7 | B8 | 1 | 0 |
| 11 | B9 | B10 | 1 | 0 |
| 12 | B11 | Y | 1 | 0 |
| 13 | C1 | C2 | 1 | 1 |
| 14 | C3 | C4 | 1 | 1 |
| 15 | C5 | C6 | 1 | 1 |
| 16 | C7 | C8 | 1 | 1 |
| 17 | C9 | C10 | 1 | 1 |
| 18 | C11 | Y | 1 | 1 |
| 19 | D1 | D2 | 1 | 1 |
| 20 | D3 | D4 | 1 | 1 |
| 21 | D5 | D6 | 1 | 1 |
| 22 | D7 | D8 | 1 | 1 |
| 23 | D9 | D10 | 1 | 1 |
| 24 | D11 | Y | 1 | 1 |

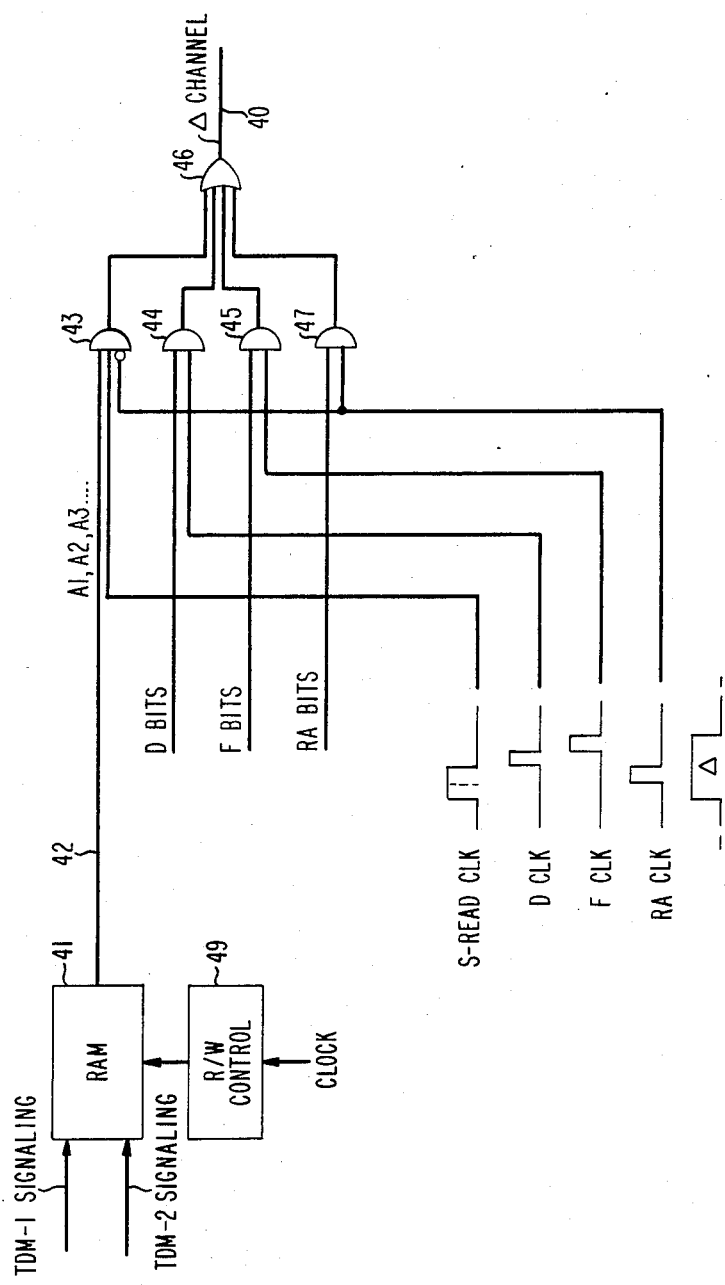

BIT COMPRESSION MULTIPLEXING

RELATED APPLICATIONS

This application is a continuation of Ser. No. 496,199, filed May 19, 1983 now abandoned.

TECHNICAL FIELD

The present invention relates to digital transmission systems and, more particularly, to a bit compression multiplexing technique.

BACKGROUND OF THE INVENTION

The first step in understanding a transmission system is to define the basic broadband transmission unit. For analog systems, this would be a channel group, which prior to transmission is typically multiplexed into supergroups and mastergroups. For digital transmission, the basic unit is the digroup (digital group) carried in the DS1 signal. The DS1 signal developed by a digital channel bank (e.g., the D-3 Channel Bank, as disclosed in U.S. Pat. No. 4,059,731, issued Nov. 2, 1977 to J. H. Green and J. E. Landry) and transmitted over a T-1 transmission line (1.544 megabits per second) is, at present, the workhorse of the Bell System digital transmission network.

The format of the DS1 digital signal consists of 24 eight-bit words and one framing bit for a total of 193 bits per frame. The 24 words typically represent 24 separate and distinct message deposited in 24 separate and distinct channels. The words are PCM (pulse code modulation) encoded and the least significant bit (i.e., eighth bit) of a channel is periodically dedicated (every sixth frame) for signaling purposes.

Now over the past several years there has been increasing interest in achieving a more efficient digital encoding. For an evolving digital network, a most interesting application is the possible replacement of the 64,000 bit-per-second (bps) PCM signal (8 bits per channel, repeated at an 8 kHz rate) for telephony. The reason, of course, is to achieve bandwidth compression, and thus a concomitant increase in transmission capacity. To this end, the patent application of D. W. Petr, Ser. No. 343,355 filed Jan. 27, 1982, now U.S. Pat. No. 4,437,087 issued Mar. 13, 1984, discloses an efficient, robust, bit compression algorithm. In accordance with the Petr invention, each 64 Kbps (DSO) signal is converted or compressed to a 32 Kbps signal thereby doubling the capacity of a T1 line, for example.

While the Petr coding algorithm reduces the bit rate for the DSO (64 kbps) channels by half, the bit rate required for signaling is potentially doubled since the number of channels to be carried on a specific facility is potentially doubled. In the DS1 digital signal the last significant bit of a channel is periodically preempted for signaling purposes with little degradation in performance. However, periodic preemption of one of the four bits of a 32 kbps coded channel could significantly impair performance. Furthermore, many of the applications which could use 32 kbps coded channels require that the signal be compatible with network switching elements such as the Digital Access and Cross-connect System (DACS), which have the capability of switching or cross-connecting DSO channels (or integral multiples thereof) while maintaining the association of the message channel and signaling therein.

DACS was designed to operate on DSO channels and the signaling scheme described previously. The introduction of 32 kbps channels in networks containing DACS poses a compatibility problem, the solution of which falls to the equipment which implements the 32 kbps coding.

The CCITT A-Law System adopted by most European administrations has a digital signal format that consists of 30 service channels, one channel devoted to framing bits together with alarm bits, and one channel devoted to signaling. Here again, however, to increase the transmission capacity of this digital signal would result in a signaling problem due to the increased bandwidth required for signaling associated with the added channels.

SUMMARY OF THE INVENTION

It is an object of the present invention to achieve a bit compressed, digital signal format that is compatible with network switching elements (e.g., DACS) and is completely transparent to signaling—that is, the signaling bits (e.g., of DS-1) are not changed or altered in any manner.

The present invention relates to a bit compression multiplexing technique for a pair of time division multiplexed digital bit streams each one of which includes a plurality of PCM encoded signals deposited in separate and distinct channels of a repetitive frame and signaling bits multiplexed therewith. The encoded signals are bit compressed, and then multiplexed and grouped into clusters. Each of the multiplexed compressed signals occupies a separate and distinct channel of a repetitive frame that includes a plurality of clusters and a corresponding number of additional channels each one of which is associated with a given cluster and is proximate thereto. The signaling bits are extracted from the pair of digital bit streams, reformatted, and then placed in predetermined ones of the additional channels. The signaling bits in a given channel are associated with the compressed signals of a cluster proximate thereto. A framing bit pattern is developed for each additional channel and the framing bits are placed into a predetermined bit position of each of the additional channels.

BRIEF DESCRIPTION OF THE DRAWINGS

The invention will be more fully appreciated from the following detailed description when the same is considered in connection with the accompanying drawings in which:

FIG. 4 is a schematic diagram of a delta channel multiplexer; and

DETAILED DESCRIPTION

Figure 1:
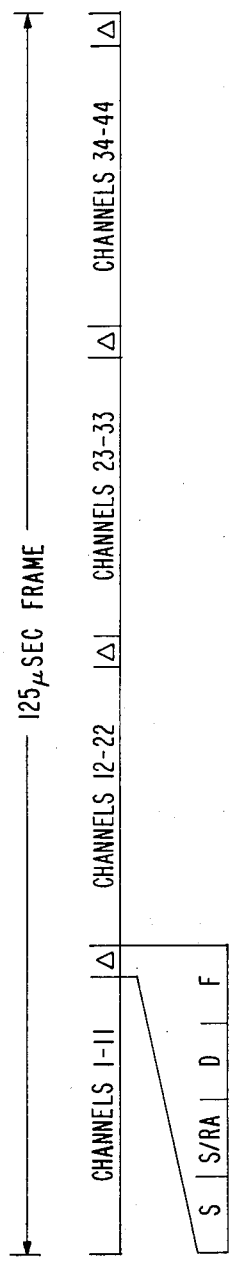
FIG. 1 illustrates the format of a bit compressed multiplexed signal in accordance with the present invention.

FIG. 1 shows a bit compressed, multiplexed, digital signal format, in accordance with the invention, which is compatible (at the bundle level) with network switching elements (such as DACS) and is completely transparent to signaling. The FIG. 1 format is achieved by bit compressing and multiplexing a pair of DS1 signals and grouping the multiplexed compressed signals into clusters. An additional channel, hereinafter called a delta (Δ) channel, is proximate to each cluster and is used for bundle-signaling, bundle-framing, and bundle-alarm. The combination of a cluster and its related delta channel is called a bundle. While the present invention will be described in the context of bit compressing and multiplexing two DS1 signals, the invention is not so limited. As will become apparent to those skilled in the art, the inventive concepts herein disclosed can be applied to other digital transmission systems which utilize other and different formats (e.g., the CCITT A-Law Format).

Returning to the showing in FIG. 1, each of the aforementioned clusters comprises eleven 4-bit digitally encoded message signals deposited in separate and distinct channels. A delta channel is associated with each cluster and is proximate thereto. A frame (125μsec) comprises a plurality (e.g., 4) of cluster/Δ channel bundles. Like the message channels, each delta channel consists of four bits. The first two bit positions of a delta channel are used for signaling purposes, with the second bit position periodically used for alarming purposes. The last bit position of each delta channel is used for framing, with the third position providing a low bit rate data link. These bit position assignments are more or less arbitrary and can, of course, be changed without departing from the spirit and scope of the invention. The signaling bits of a delta channel carry the signaling information for the preceding eleven message channels; the framing bit information is for the assignment of received signaling to the proper message channels; the periodically occurring alarm bits are used to transmit a bundle-yellow alarm to a remote location (similar to a channel bank yellow alarm); and, the data link bit(s) can be used to send maintenance information, for example.

Figures 3, 5:
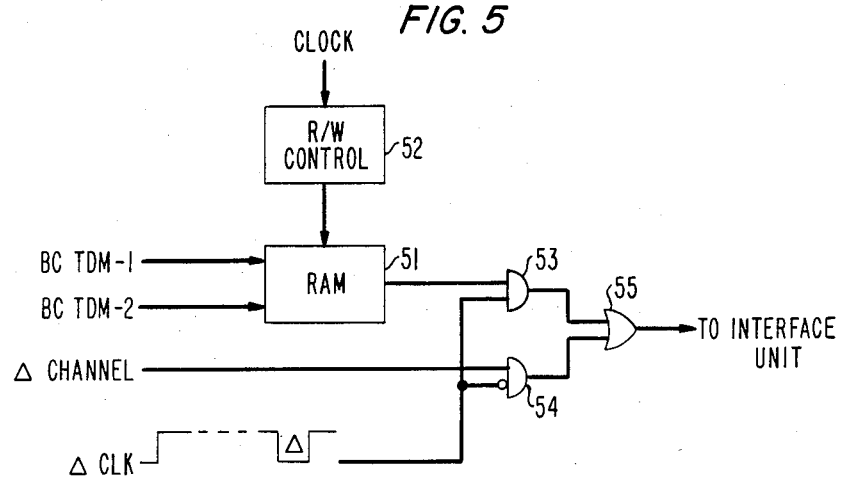
FIG. 3 illustrates the format of the delta $ DELTA $ channel shown in FIG. 1.
FIG. 5 is a simplified schematic diagram of a means for multiplexing the compressed signals and delta channel(s) into the FIG. 1 format.

FIG. 3 illustrates the delta channel format in greater detail. It is contemplated that the invention will be utilized in connection with the known extended superframe format of 24 frames, as disclosed for example in the patent application of R. D. Howson, Ser. No. 310,779, filed Oct. 13, 1981 now U.S. Pat. No. 4,397,020 issued Aug. 2, 1983. The horizontal row associated with each of these 24 frames contains the content of the four delta channel bits in that frame. Sixteen state signaling, employing four signaling bits (A, B, C and D), is assumed. The letters in FIG. 3, therefore, refer to a signaling bit (A, B, C or D) and the numbers adjacent thereto refer to the related message channel in the cluster (ranging from 1 to 11). Accordingly, the delta channel of frame No. 1 carries the A signaling bits for the first and second channels of the associated cluster; the delta channel of frame No. 2 carries the A signaling bits for the third and fourth channels of the cluster, and so on. And, by way of further explanation, the designated A1, B1, C1 and D1 signaling bits carry the 16-state signaling for the first channel of the associated channel cluster.

The second bit position of a delta channel (column "S/RA" of FIG. 3) is preempted or used at regular intervals for remote alarm (RA) purposes; this bit position is designated by the letter Y. The third bit position of a delta channel (row D in FIG. 3) can be utilized as a low bit rate data link for the transmission of maintenance information, for example. The last bit position (row F) is used for bundle-framing purposes. The framing format shown in FIG. 3 is relatively simple and has the advantage of hardware simplicity. However, any of a number of known or even new framing formats can be used for this purpose.

For a bundle with less than eleven active message channels the available signaling bit positions in the delta channel are simply not used. The same is true of the Y bit positions if a yellow-alarm condition is not called for. For 4-state signaling (A and B signaling bits) the C and D bits of the delta channel are replaced by updates of A and B.

Figure 2:
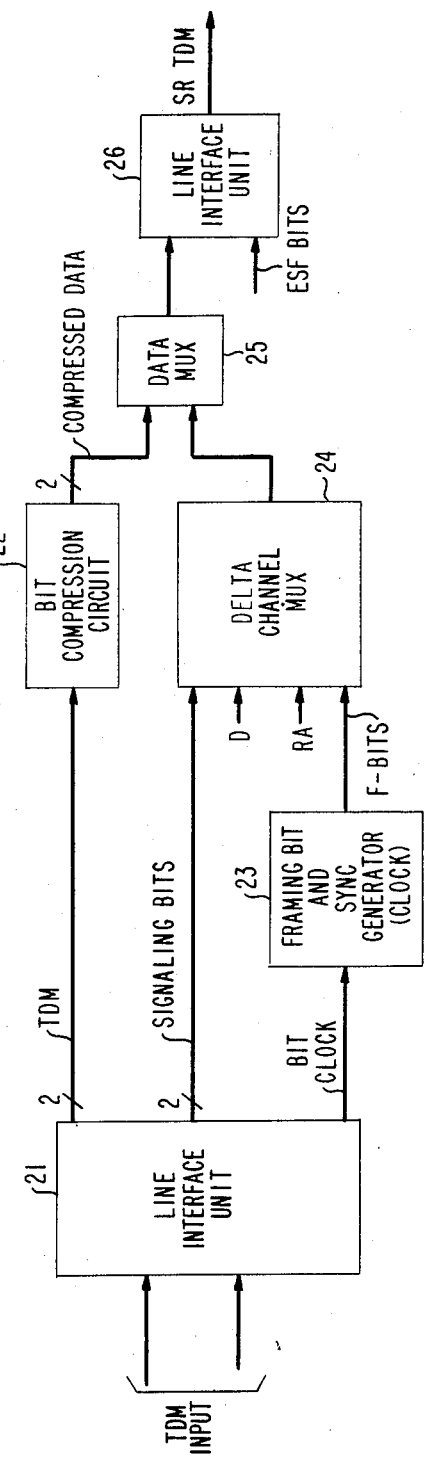
FIG. 2 is a simplified schematic block diagram of a bit compression multiplexer which develops the frame format shown in FIG. 1.

Turning now to the schematic block diagram of FIG. 2, a pair of time division multiplexed (TDM) digital bit streams (e.g., DS1 digroups) are delivered to the line interface unit 21. As the name implies, the interface unit 21 interfaces the bit compression multiplexer (BCM) of FIG. 2 to other equipment. The interface circuitry will typically include an equalizer circuit for the equalization of gain and/or delay distortion, detectors for facility performance monitoring, provision for DS1 loopback for maintenance, bipolar-to-unipolar conversion, etc. The line interface circuitry is conventional in design and its functions well known to those in the art. One circuit pack of interface 21 contains reference clock extraction circuitry which generates a "bit clock" signal from one of the input DS1 signals. Another interface circuit serves to extract the signaling bits of the input DS1 signals; signaling bit extraction is a standard feature of all digital channel banks, for example. The interface unit 21 delivers the pair of TDM signals to the bit compression circuit 22. For convenience and hardware simplicity, the TDM output singals from interface circuit 21 are frame aligned (by buffering).

The circuit 22 serves to bit compress each of the 64 Kbps message signals of the input TDMs to a 32 Kbps signal. The bit compression algorithm of the cited Petr patent can be advantageously used for this purpose. For example, a pair of coders such as disclosed in the Petr patent can be used to respectively bit compress the 64 Kbps signals of each TDM bit stream. The compressed data (i.e., the bit compressed TDMs) is delivered to the multiplexer 25.

The synchronization generator (or BCM system clock) 23 is "slaved" to the network timing provided by the aforementioned reference clock extraction circuit. A local phase-locked loop (PLL) of generator 23 locks its oscillator to the 1.544 Mhz line clock. The sync generator circuit generates the local clocks and tailored synchronization signals required by the various functions of the FIG. 2 system. The generator 23 also generates the bundle-framing bits (F-bits) in a pattern as shown in FIG. 3.

The signaling bits from interface 21 and the framing bits from generator 23 are delivered to the delta channel multiplexer 24 along with remote alarm (RA) bits, if an alarm condition exists, and data (D) bits if low bit rate data is to be transmitted. The remote alarm bits are generated by a framer (not shown) in response to a detected bundle out-of-frame condition, and the data bits may be generated by a data set (not shown). The multiplexer 24 combines or multiplexes these bits in the manner illustrated in FIG. 3. This bit multiplexing operation is relatively straightforward and can be carried out in one of several ways.

FIG. 4 is a simplified showing which illustrates this multiplexing operation. The signaling bits are written into respective storage locations of the random-access-memory (RAM) 41. These storage locations are then accessed in a predetermined manner so that the signaling bits on the RAM output lead 42 correspond to the desired format; i.e., the A signaling bits for the bundle-channels 1 through 11 appear in sequence on lead 42, followed by the B signaling bits, etc. Thus, the RAM 41 serves the function of reformatting the signaling bits. However, the signaling bits are not changed or altered in any way.

As each signaling bit stored in RAM is accessed and read out, the AND gate 43 is enabled by an S-read clock signal generated by sync generator 23. In this manner, a pair of signaling bits are read out of RAM and coupled to the Δ channel output lead 40 via the enabled gate 43 and OR gate 46. Following the read-out of a pair of signaling or S-bits, the AND gate 44 is enabled by a D clock pulse and a data bit (D) is coupled to the lead 40 immediately after the pair of S-bits. Finally, during the next bit interval, the F clock from sync circuit 23 serves to enable the AND gate 45 and an F-bit is coupled to the lead 40. The RA clock periodically enables the AND gate 47 and inhibits gate 43 so that the second bit position of a delta channel can be used at intervals for alarming purposes. The described operation is repeated four times per frame, during each $ DELTA $ channel interval. There are, of course, other ways in which the delta channel multiplexing can be carried out and the invention is in no way limited to the specific multiplex implementation shown. For example, instead of the simplified gating arrangement shown in FIG. 4, a state-of-the-art multiplexer could be used. Alternatively, the D, F and RA bits could also be stored in RAM 41 and then read out in the desired multiplexed sequence by read/write control 49.

Returning to FIG. 2, the bit compressed TDMs (i.e., compressed DS1 digroups) are multiplexed with each other and with the delta channel signal(s) in the data multiplexer 25 to achieve the bit compressed multiplexed signal shown in FIG. 1. There are, of course, a number of ways of multiplexing the compressed data signals. For purposes of explanation, it will be assumed that the compressed channels from the two digroups are not mixed when assigned to bundles. In this case, channels 1-22 of FIG. 1 would be dedicated to channels originating from digroup A and channels 23-44 would be dedicated to channels originating from digroup B. Alternatively, the bundles could be assigned compressed channels by interleaving a compressed channel from digroup A followed by a channel from digroup B, for example. Still other multiplexing arrangements should be readily apparent.

FIG. 5 shows an arrangement which could be used to perform the compressed data-delta channel multiplexing. The bit compressed, time division multiplexed signals (BC TDM) are written into storage locations in random access memory 51 under R/W control 52. These storage locations are accessed in a predetermined manner, also controlled by the R/W coontrol 52, to assemble each cluster from compressed channels originating from a single digroup. Other forms of cluster assemble are easily envisioned. A simple gating arrangement, shown in FIG. 5, could be used to append the delta channel to a cluster of 11 compressed channels. When the delta channel clock or Δ clock is high, AND gate 53 is enabled, permitting the compressed channels to be delivered to the interface unit through the OR gate 55. At the same time, the Δ clock inverted disables AND gate 54, blocking the insertion of the delta channel. When the delta channel clock goes low, AND gate 53 is disabled, blocking the compressed channel data; AND gate 54 is enabled, permitting the delta channel to be delivered to the interface unit through the OR gate 55. Here again, the circuit arrangement of FIG. 5 is merely exemplary and this multiplexing can be implemented in other ways.

The interface unit 26 interfaces the bit compression multiplexer to the transmission network. It performs a number of known conventional functions, such as unipolar to bipolar conversion, as well as the addition of the extended superframe (ESF) bits to the outgoing time division multiplexed digital bit stream.

Each cluster of message channels and its related delta channel comprise a bundle that can be readily handled (i.e., switched) by the existing equipment; that is, the bundles are DACS compatible. Since each bundle, in effect, corresponds to an integral number of DS0 channels, it can be cross-connected or switched via DACS. Each bundle is totally independent from the other bundles of the sub-rate TDM signal. This permits the bundles to be independently networked; the four bundles leaving one bit compression multiplexer can be sent to four different bit compression demultiplexers.

Digital data (e.g., 56 Kbps data) may be integrated with voice channels in a bundle to add further network capability. In this case, a 64 Kbps channel is inserted or used in place of sub-rate channels 1 and 2, for example. Since digital data must not be bit compressed, the coder 22 is made transparent to digital data—i.e., the coder is temporarily placed in a by-pas mode for digital data.

Two full-rate DS1s can supply 48 DS0 channels of which only 44 can be compressed onto the sub-rate DS1. The other four channels are not transmitted. However, it is not likely, particularly for use of the invention for private line purpsoes, that all 24 channels of each DS1 will be active at any given time.

It must be understood at this point that the foregoing disclosure is merely illustrative of the principles of the present invention and numerous modifications or alterations may be devised by those skilled in the art. For example, the four bits that comprise a delta channel have been described as lying proximate to each other. However, these four bits could, in fact, be distributed, throughout the related bundle, without departing from the spirit and scope of the invention.

What is claimed is:

1. A bit compression multiplexing system for a pair of time division multiplexed digital bit streams each of which includes a plurality of PCM encoded signals in separate and distinct channels of a repetitive frame and signaling bits multiplexed therewith comprising:

means (22) for bit-rate compressing the PCM encoded signals into differential PCM signals;

means (25) for multiplexing the compressed differential PCm signals and grouping the same into clusters, each of the clusters including predetermined number of compressed signal channels and each of the compressed differential PCM signals occupying a separate and distinct channel of a repetitive frame that includes a plurality of said clusters and a corresponding plurality of additional channels each one of which is associated with a given cluster and is proximate thereto, wherein a predetermined number of said repetitive frames forms a repetitive superframe;

means (21, 24, 25) for extracting and reformatting the signaling bits of said time division multiplexed digital bit streams and placing the same in predetermined ones of said plurality of additional channels in the repetitive frames of said superframe, the signaling bits in a given additional channel being associated with the compressed differential PCM signals of a cluster proximate thereto; and means (23, 24) for developing a framing bit pattern for each of said plurality of clusters and for inserting the bits of the same into a predetermined bit position of the additional channel associated with an proximate to each of said clusters in the reptitive frames of said superframe.

2. A bit compression multiplexing system as defined in claim 1 wherein a frame of compressed signals is of the same duration as a frame of said pair of digital bit streams.

3. A bit compression multiplexing system as defined in claim 2 wherein each of the pair of multiplexed digital bit streams carries sixteen state signaling.

4. A bit compression multiplexing system as defined in claim 2 wherein a predetermined bit position of each of said dditional channels is reserved to provide low bit rate data links.

5. A bit compression multiplexing system as defined in claim 2 including means (47) coupled to the multiplexing means for periodically inserting an alarm bit in a given additional channel to indicate a bundle-alarm condition.

6. A bit compression multiplexing system as defined in claim 2 wherein the digital bit streams are DS1 signals.

7. A bit compression multiplexing method for a pair of time division multiplexed digital bit streams each of which includes a plurality of PCM encoded signals in separate and distinct channels of a repetitive frame and signaling bits multiplexed therewith comprising the steps of:

bit-rate compressing the encoded PCM signals into differential PCM signals;

multiplexing the compressed differential PCM signals and grouping the same into clusters, each of the clusters including a predetermined number of multiplexed compressed signal channels and each of the compressed differential PCM signals occupying a separate and distinct channel of a repetitive frame that includes a plurality of said clusters and a corresponding plurality of additional channels each one of which is associated with a given cluster and is proximate thereto, wherein a predetermined number of said repetitive frames forms a repetitive superframe;

extracting the signaling bits from the pair of time division multiplexed digital bit streams;

reformatting the extracted signaling bits and placing the same in predetermined bit positions of said additional channels in the repetitive frames of said superframe, the signaling bits in a given additional channel being associated with the compressed differential PCM signals of a cluster proximate thereto; and developing a framing bit pattern for each of said plurality of clusters and inserting the bits of the same into a predetermined bit position of the additional channel associated with and proximate to each of said clusters in the repetitive frames of said superframe.

* * * * *